United States Patent [19]

Lahti et al.

[11] Patent Number: 4,799,633

[45] Date of Patent: Jan. 24, 1989

[54] LAMINAR FLOW NECELLE

[75] Inventors: Daniel J. Lahti; James L. Younghans, both of Cincinnati, Ohio

[73] Assignee: General Electric Company, Cincinnati, Ohio

[21] Appl. No.: 77,963

[22] Filed: Jul. 27, 1987

Related U.S. Application Data

[63] Continuation of Ser. No. 437,581, Oct. 29, 1982, abandoned.

[51] Int. Cl.$^4$ ............................................. B64D 29/00
[52] U.S. Cl. .................................. 244/130; 244/53 R; 244/35 R
[58] Field of Search ................. 244/34 A, 35 R, 53 B, 244/53 R, 130, 73 R, 15; 60/226.1

[56] References Cited

U.S. PATENT DOCUMENTS

| | | |
|---|---|---|
| 2,408,788 | 10/1946 | Ludington et al. . |
| 2,562,227 | 7/1951 | Zobel . |
| 2,805,831 | 9/1957 | Von Zborowski . |
| 3,533,237 | 10/1970 | Rabone et al. . |
| 3,750,689 | 8/1973 | Britt . |
| 3,756,540 | 9/1973 | Williams . |
| 3,765,623 | 10/1973 | Donelson et al. . |
| 3,952,971 | 4/1976 | Whitcomb . |
| 4,121,787 | 10/1978 | Wilby . |
| 4,132,240 | 1/1979 | Frantz . |
| 4,205,813 | 6/1980 | Evans et al. ................. 60/226.1 |
| 4,209,149 | 6/1980 | Morris et al. . |
| 4,325,675 | 4/1982 | Gallot et al. . |

OTHER PUBLICATIONS

AIAA Paper No. 73-86 by Robert H. Liebeck, dated Jan. 10-12, 1973, "A Class of Airfoils Designed for High Lift in Incompressible Flow".

Primary Examiner—Joseph F. Peters, Jr.
Assistant Examiner—Rodney Corl
Attorney, Agent, or Firm—Derek P. Lawrence

[57] ABSTRACT

An improved nacelle is provided for housing an aircraft engine and reducing aerodynamic drag during aircraft operation. In one embodiment, the nacelle houses a gas turbine engine and comprises a leading edge and a trailing edge, having a reference chord extending therebetween, and an outer surface which is continuous from the leading edge to the trailing edge. The outer surface includes a forward portion, an intermediate portion and an aft portion that has a profile defined by a varying thickness measured perpendicularly from the chord to the outer surface. The profile has a maximum thickness at the intersection of the forward and intermediate portions, which intersection is located greater than about 36% of the chord from the leading edge, and is effective for increasing laminar flow over the nacelle for reducing aerodynamic drag.

25 Claims, 2 Drawing Sheets

LAMINAR FLOW NECELLE

This is a continuation of co-pending application Ser. No. 437,581 filed on Oct. 29, 1982, now abandoned.

cFIELD OF THE INVENTION

This invention relates to a nacelle for housing an aircraft engine, and, more particularly, to a nacelle effective for reducing aerodynamic drag therefrom.

BACKGROUND OF THE INVENTION

In a subsonic aircraft having an externally mounted engine, for example, a gas turbine engine mounted below a wing by a pylon, aerodynamic drag due to freestream airflow over the nacelle of the engine can typically represent approximately 4% of the total engine thrust output. Any reduction in this aerodynamic drag can result in a significant saving in the amount of fuel consumed.

Accordingly, a desired function of an engine nacelle is to provide a lightweight housing for the aircraft engine which produces relatively low aerodynamic drag. An example of a prior art low drag nacelle is disclosed in U.S. Pat. No. 3,533,237, issued to G. R. Rabone et al, assigned to the present assignee, and incorporated herein by reference.

The aerodynamic drag due to a nacelle is determined by the pressure distribution and a dimensionless friction coefficient $C_f$, known to those skilled in the art, over the outer surface of the nacelle over which the freestream air flows during aircraft flight. It is known to those skilled in the art that reduced aerodynamic drag exists where the surface pressure distribution promotes a laminar boundary layer over the nacelle outer surface without any boundary layer separation thereof. The friction coefficient $C_f$, and thus aerodynamic drag, have reduced values when a laminar boundary layer exists.

Also known to those skilled in the art is that where the boundary layer along the nacelle outer surface transitions from laminar to turbulent, the friction coefficient $C_f$, and thus aerodynamic drag, have increased values. Accordingly, it is desirable to provide a nacelle which promotes a surface pressure distribution effective for increasing the extent of laminar boundary layer flow, reducing the extent of turbulent flow and avoiding boundary layer separation.

A nacelle is typically an annular member which houses an aircraft engine, such as a gas turbine engine. Unlike a wing which extends longitudinally and has upper and lower surfaces designed for maximum lift and reduced drag, a nacelle extends circumferentially and has an outer surface designed primarily to house an engine and reduce drag.

However, in both a nacelle and a wing the pressure distribution over the surfaces thereof is a significant factor in determining the extent of laminar and turbulent airflow thereover. In a wing, for example, the pressure distribution is dependent on the contours of the leading and trailing edges and the upper and lower surfaces. A change in any contour affects the entire pressure distribution over the wing.

In a nacelle, in contrast, the pressure distribution is primarily affected by the contours of the leading and trailing edge regions and the outer surface. The inner surface of the nacelle has little interaction with the freestream airflow, and therefore has less affect on the pressure distribution.

Furthermore, inasmuch as a nacelle is typically mounted to an aircraft near a fuselage, pylon or wing, the pressure distribution over the nacelle can also be affected by the presence of these adjacent structures. A change in any contour of the elements of the nacelle and the presence of adjacent structures affects the entire pressure distribution over the outer surface of the nacelle.

Past attempts at maintaining and extending laminar flow on wings and nacelles have involved the use of active control devices. An active control device requires an auxiliary source of energy to cooperate with the surface for energizing or removing the boundary layer for maintaining laminar flow and preventing boundary layer separation.

For example, boundary layer suction or blowing slots or holes disposed in the surface to be controlled are known in the art. The slot is connected to a pump by internal ducting and is effective for reducing or preventing turbulent flow, and thereby maintaining laminar boundary layer flow. However, the additional weight and energy required to power the active control device typically offsets advantages due to reduced aerodynamic drag.

Accordingly, it is one object of this invention to provide an improved nacelle for housing an aircraft engine which is effective for reducing aerodynamic drag during aircraft operation.

Another object of this invention is to provide an improved nacelle which does not require an active device for reducing aerodynamic drag.

Another object of this invention is to provide an improved nacelle having increased areas of laminar flow and decreased areas of turbulent flow thereover.

Another object of this invention is to provide an improved nacelle having a profile effective for controlling surface pressure distribution thereover for reducing aerodynamic drag.

SUMMARY OF THE INVENTION

An improved nacelle is provided for use on an aircraft that reduces aerodynamic drag during aircraft operation. In one embodiment, the nacelle houses a gas turbine engine and comprises a leading edge and a trailing edge, having a reference chord extending therebetween, and an outer surface which is continuous from the leading edge to the trailing edge. The outer surface includes a forward portion, an intermediate portion and an aft portion and has a profile defined by a relative thickness measured perpendicularly from the reference chord to the outer surface. The profile has a maximum thickness at the intersection of the forward and intermediate portions, which intersection is located greater than about 36% of the chord from the leading edge. The profile of the outer surface is effective for producing laminar flow along the forward portion and pressures which decrease continuously at a negative gradient from the leading edge to the intersection, and turbulent flow along the intermediate and aft portions and pressures which increase continuously at a positive gradient from the intersection to the trailing edge.

BRIEF DESCRIPTION OF THE DRAWINGS

The invention, together with further objects and advantages thereof, is more particularly described in the following detailed description taken in conjunction with the accompanying drawings in which.

DETAILED DESCRIPTION

Figure 1:
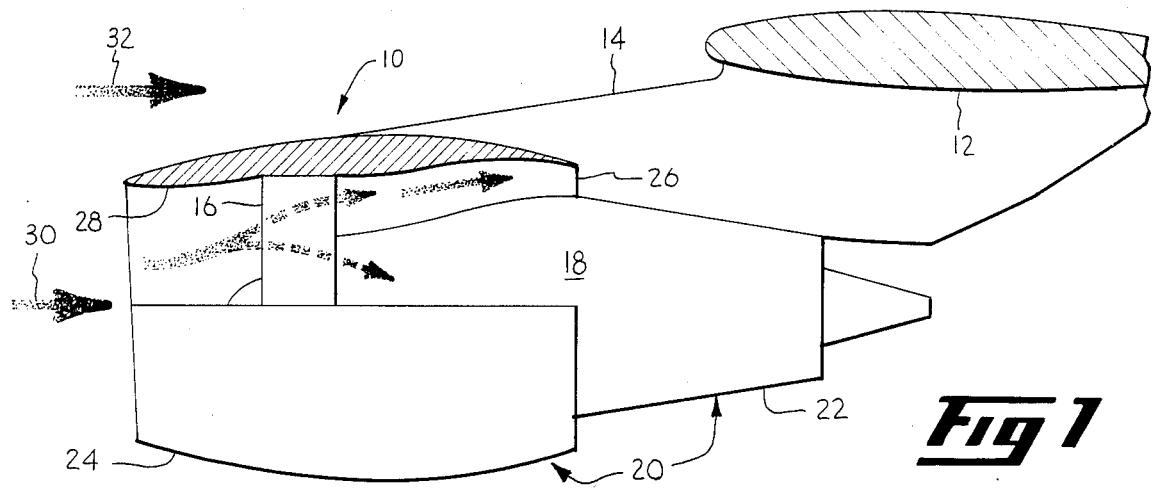
FIG. 1 is a view partially in cross section of a turbofan engine mounted to a wing of an aircraft by a pylon and incorporating a nacelle according to one form of the present invention.

Illustrated in FIG. 1 is a high bypass gas turbofan engine 10 mounted to a wing 12 of an aircraft (not shown) by an aerodynamically shaped pylon 14. The turbofan engine 10 includes a fan assembly 16 driven by a core engine 18.

Housing the engine 10 is an annular nacelle 20 including a core cowl 22 surrounding the core engine 18 and a fan cowl 24, according to one form of the present invention, surrounding the fan assembly 16. The fan cowl 24 also surrounds and is spaced from a forward portion of the core cowl 22 for defining an annular fan discharge nozzle 26. The fan cowl 24 includes an inlet throat 28 for receiving an engine airflow portion 30 of a freestream airflow 32.

During aircraft operation, such as for example at cruise, the engine airflow 30 is accelerated by the fan assembly 16 and is discharged from the fan nozzle 26 over the core cowl 22 for generating thrust. The freestream airflow 32 flows downstream over the fan cowl 24 of the nacelle 20 and interacts with or scrubs the fan cowl 24 and produces aerodynamic drag, a significant portion of which is frictional drag acting in a direction opposite to that of the cruising aircraft.

A primary purpose of the present invention is to provide a nacelle, such as the fan cowl 24, that is effective for reducing aerodynamic drag due to freestream airflow 32 thereover during subsonic aircraft cruise. Reduced aerodynamic drag at cruise is achieved by providing the fan cowl 24 with a predetermined aerodynamic surface profile effective for producing a pressure distribution to promote a natural laminar boundary layer over an increased portion of the outer surface of the fan cowl 24 of the nacelle 20 without causing boundary layer separation. However, inasmuch as engine airflow 30 discharged from the fan nozzle 26 primarily flows over the core cowl 22, the profile of the core cowl 22 of the nacelle 20 is preferably determined according to conventional standards.

Figure 2:
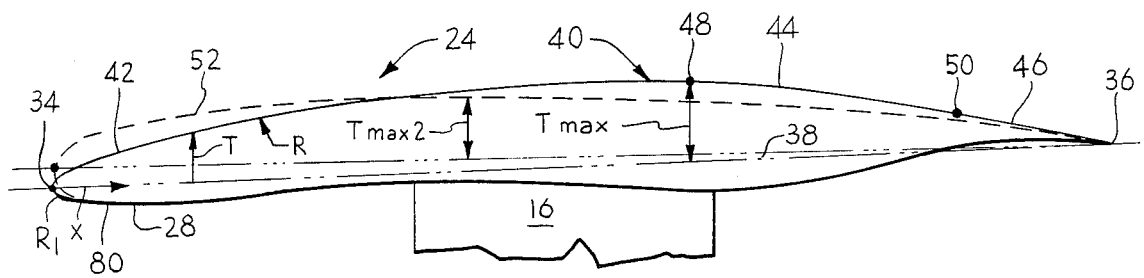
FIG. 2 is an enlarged sectional view of the nacelle of FIG. 1.

Illustrated in more detail in FIG. 2 is the fan cowl 24 of FIG. 1. The fan cowl 24 includes an annular leading edge 34 and an annular trailing edge 36 having a reference chord 38 of length C extending therebetween. The fan cowl 24 also includes an outer surface 40 which is continuous from the leading edge 34 to the trailing edge 36. The outer surface 40 includes a forward portion 42, an intermediate portion 44 and an aft portion 46. The forward portion 42 extends from the leading edge 34 to a first intersection 48 joining the forward portion 42 and the intermediate portion 44. The aft portion 46 extends from a second intersection 50 to the trailing edge 36 and joins the intermediate portion 44.

A significant feature of the fan cowl 24 is the profile of the outer surface 40. The profile is the outline of the outer surface 40 and can be defined by a varying relative thickness T representing the perpendicular distance of the outer surface 40 from the reference chord 38. The thickness T increases along the chord 38 from the leading edge 34 to a position of maximum thickness $T_{max}$ at the first intersection 48. The thickness T then decreases along the chord 38 from the first intersection 48 to the trailing edge 36.

Another significant feature of the fan cowl 24 is that the maximum thickness $T_{max}$ is located farther aft along the chord 38 than the maximum thickness $T_{max2}$ of a typical prior art nacelle 52, indicated in broken line in FIG. 2 for comparison purposes. This feature and features to be described hereinafter promote laminar flow along the forward portion 42 while limiting turbulent flow to the intermediate portion 44 and the aft portion 46 without boundary layer separation.

To more fully appreciate the significance of the present invention, a description of the pressure distribution over the fan cowl 24 is appropriate. It is known to those skilled in the art that a pressure gradient due to freestream airflow imposed on a nacelle surface, such as outer surface 40 of the fan cowl 24, affects the location of boundary layer transition from laminar flow to turbulent flow. Generally a negative pressure gradient, i.e., pressure decreasing in the flow direction delays transition from laminar to turbulent flow.

It is also known that a positive pressure gradient must follow a negative pressure gradient to return the pressure back to an ambient, freestream value. It is in this positive pressure gradient region that the flow over the nacelle becomes turbulent, resulting in increased drag.

However, to increase the extent of laminar flow in a nacelle of finite length, the length in which the pressure can be returned to ambient must necessarily decrease. This has been a limiting factor in prior art nacelles because the decreased length remaining to return the pressure to ambient promotes boundary layer separation. Boundary layer separation initiating in the turbulent flow region significantly increases drag and is therefore undesirable. Accordingly, nacelles of the prior art typically include relatively large regions of turbulent flow for suitably returning pressures to ambient for preventing boundary layer separation.

However, according to the present invention, a significant increase in the extent of laminar flow without boundary layer separation can be realized by providing a predeterminedly shaped fan cowl 24, such as the one shown in FIG. 2, that is effective for promoting a predetermined pressure distribution over the outer surface 40 of the fan cowl 24.

Figure 3:
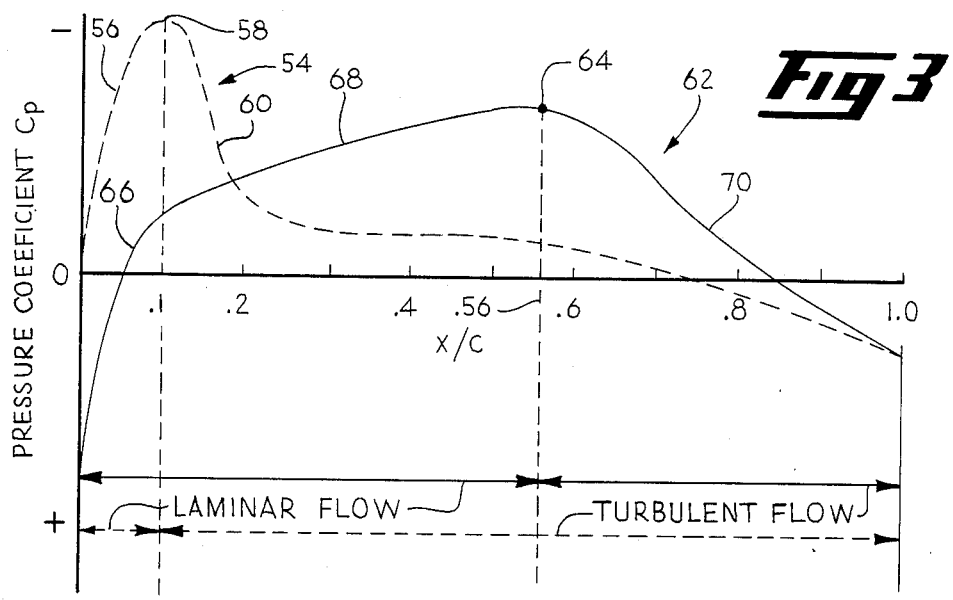
FIG. 3 is a graph according to one form of the present invention representing pressure distribution along the outer surface of the nacelle of FIG. 2 relative to a reference chord extending from a leading edge to a trailing edge thereof.

Illustrated in FIG. 3 is a graph according to the present invention indicating pressure distributions due to freestream airflow over an outer surface of a nacelle such as the fan cowl 24 shown in FIG. 2. The abscissa represents a normalized, nondimensional distance X/C, where C is the length of the chord 38 and X is a distance measured along the chord 38 from the leading edge 34 (as shown in FIG. 2). For example, the leading edge 34 and the trailing edge 36 are located at X/C=0.0 and X/C=1.0, respectively, which can alternatively be stated as 0% C or 100% C, respectively.

The ordinate in FIG. 3 represents pressure over the surface of the fan cowl 24 at each point of abscissa X/C. The pressure can be, for example, a pressure coefficient $C_p$ defined as $2(P_S-P) dv^2$; where P, v and d represent the pressure, velocity and density, respectively, of the freestream airflow 32 and $P_S$ represents static pressure measured at the nacelle outer surface. The pressure could also be represented, for example, by $P_S/P_T$, where $P_T$ represents freestream airflow total pressure.

An example of a prior art $C_P$ distribution 54 for a nacelle is represented by the broken line in FIG. 3 and substantially corresponds to the prior art nacelle 52 shown in broken line in FIG. 2. The prior art $C_P$ distribution 54 includes a negative pressure gradient portion 56 which extends from 0% C to about 10% C. The negative gradient portion 56 produces a small length of laminar flow having a relatively low value of the friction coefficient $C_f$, indicating relatively low drag. At about 10% C, the prior art $C_P$ distribution 54 includes a minimum, negative, $C_P$ 58 about which the $C_P$ distribution changes abruptly from the negative gradient portion 56 to a positive pressure gradient portion 60. The positive pressure gradient portion 60 extends from about 10% C to 100% C. The abrupt $C_P$ change at 10% C and the positive gradient portion 60 produces a relatively large length of turbulent flow having a relatively high friction coeffient $C_f$ resulting in increased aerodynamic drag. It is to be noted that boundary layer separation is reduced or avoided in the prior art nacelle 52 by increasing the extent of turbulent flow at the expense of reducing the extent of laminar flow, resulting in increased drag.

Also shown in the graph of FIG. 3, is a predetermined laminar flow $C_P$ distribution 62 according to one form of the present invention. The laminar flow $C_P$ distribution 62 provides for an increased extent of laminar flow over that of the prior art, and without boundary layer separation. The $C_P$ distribution 62 is characterized by a continuously decreasing pressure coefficient $C_P$ from 0% C to a position of minimum, negative, $C_P$ 64 located greater than about the 10% C of the prior art. In the particular embodiment shown in FIG. 3, the position of minimum $C_P$ 64 is between about 50% C and about 60% C, and is, preferably, at about 56% C. Furthermore, the position of the minimum $C_P$ 64 corresponds with the position of maximum thickness $T_{max}$ at the first intersection 48 of FIG. 2. This is in contrast with the prior art nacelle 52 of FIG. 2, wherein the position of minimum $C_P$ 58 of FIG. 3 is spaced forwardly of the position of the prior art maximum thickness $T_{max2}$ in FIG. 2.

In the embodiment of the present invention shown in FIG. 3, the laminar flow $C_P$ distribution 62 includes a first negative gradient portion 66 which decreases from a positive value of $C_P$ at 0% C to a negative value of $C_P$ at approximately 10% C. The $C_P$ distribution 62 includes a second negative gradient portion 68 which is continuous with the first portion 66 and extends from approximately 10% C to the minimum $C_P$ 64 at about 56% C. The second portion 68 has a negative gradient of lesser magnitude than the gradient of the first portion 66. Furthermore, both the first portion 66 and the second portion 68 are substantially convex with respect to the abscissa X/C.

The term convex is intended to indicate that a curve, such as the second portion 68, has a center of radius of curvature located between the curve and the abscissa X/C. Correspondingly, the term concave is intended to indicate that a curve has a center of radius of curvature located on that side of the curve opposite to the abscissa X/C.

A significant feature of the present invention which permits increased extent of reduced drag laminar flow along the nacelle surface 40 is a predetermined positive gradient portion 70. The positive gradient portion 70 extends from about 56% C to 100% C and is effective for preventing boundary layer separation. More specifically, at about 56% C, the laminar flow $C_P$ distribution 62 includes a transition portion about the minimum $C_P$ 64 wherein the slope or gradient of the curve changes from negative to positive in value. This change occurs more gradually than the abrupt change found in the prior art $C_P$ distribution 54 and is a factor in preventing boundary layer separation. From approximately 56% C to 100% C, the positive gradient portion 70 extends from the minimum $C_P$ 64 to a positive value of $C_P$, respectively. In a preferred embodiment, the positive gradient portion 70 along the aft portion 46 adjacent the trailing edge 36 (as in FIG. 2) decreases at a decreasing rate and has a substantially concave profile with respect to the abscissa X/C, and, for example, can be parabolic.

When a nacelle, such as the fan cowl 24 shown in FIG. 2, is contoured to provide a pressure distribution such as represented by the laminar flow $C_P$ distribution 62 shown in FIG. 3, laminar flow can be made to exist from 0% C to approximately 56% C. The laminar flow and the low coefficient of friction $C_f$ associated therewith results in a nacelle surface having significantly reduced aerodynamic drag during aircraft cruise operation without boundary layer separation.

Figure 4:
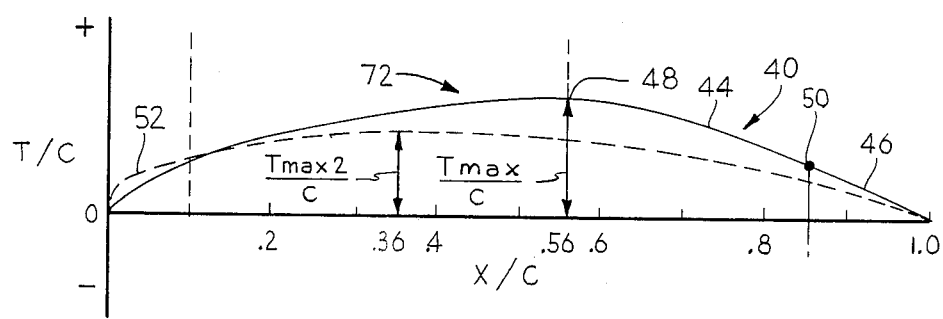
FIG. 4 is a graph illustrating a profile of the nacelle of FIG. 2 normalized with respect to the reference chord which is effective for obtaining a pressure distribution according to FIG. 3.

Illustrated in FIG. 4 is a normalized profile 72 of a nacelle profile according to one embodiment of the present invention. The abscissa is X/C, as above-described, and the ordinate represents the thickness T divided by the chord length C. The nacelle profile 72 is effective for promoting the laminar flow $C_P$ distribution 62 of FIG. 3. Inasmuch as the nacelle profile 72 is normalized, it is applicable for defining any nacelle simply by appropriate scaling. In this regard, the nacelle profile 72 of FIG. 4 is a nondimensional representation of the fan cowl 24 shown in FIG. 2.

Although the desired laminar flow $C_P$ distribution 62 of FIG. 3 according to the invention has been determined, it is not possible to completely predetermine a specific profile of the fan cowl 24 suitable for all aircraft engine applications. This is so inasmuch as the pressure distribution about the fan cowl 24 is influenced by many factors as above-described.

Accordingly, the specific profile of the fan cowl 24 of FIG. 2 which is effective for promoting the desired laminar flow $C_P$ distribution 62 of FIG. 3 will vary according to the particular structural requirements in any given application. To determine the specific profile, an inverse method of analysis, known to those skilled in the art, can be used. By this inverse method, the profile of the fan cowl 24 is systematically varied and a resulting $C_P$ distribution is analytically or experimentally determined taking into account any appropriate factors until the desired $C_P$ distribution 62 is produced. However, although generally no two laminar flow nacelle profiles according to the present invention will be identical, such nacelles will possess common features which distinguish the nacelle over those of the prior art.

One common feature, as above-described, is the location of the maximum thickness $T_{max}$ along the chord 38 at about 50% C to about 60% C and at the position of minimum $C_P$ 64.

Another feature is shown in the normalized thickness graph of FIG. 4. The maximum thickness $T_{max}$ of the fan cowl 24 is greater than that of the prior art nacelle 52. Furthermore, the magnitude of $T_{max}$ according to the invention ranges between about 6% and about 10% of the chord length C and is preferably about 7% thereof.

The curvature of the profile of the fan cowl 24 of FIGS. 2 and 4 according to the invention is also a significant factor for obtaining the laminar flow $C_P$ distribution 62 of FIG. 3. Beginning with the region near the leading edge 34 of the fan cowl 24, as shown in FIG. 2 and in more detail in FIG. 6, the leading edge 34 has a radius of curvature $R_1$ which is less than about 0.5% of the chord length C. $R_1$ is typically smaller than those of the prior art nacelle 52 and ranges between 0.1% and about 0.5% of the chord length C, with 0.1% thereof being preferred.

Figure 6:
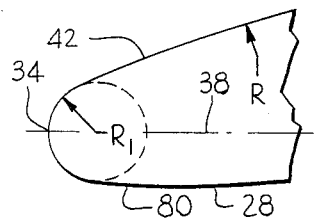
FIG. 6 is an enlarged view of a leading edge region of the nacelle of FIG. 2.

An inner surface 80 of the fan cowl 24 adjacent the leading edge 34, shown in FIGS. 2 and 6, is suitably aerodynamically blended to the inlet throat 28 according to conventional standards. The curvature of the outer surface 40 of the fan cowl 24 is defined in more detail in FIG. 5, which illustrates a graph of the radius of curvature R of the profiles of FIG. 2 normalized with respect to the chord length C and plotted against X/C. A laminar flow R/C curve 74 according to the invention is indicated in solid line and, for comparison, a prior art R/C curve 76 for the prior art nacelle 52 of FIG. 2 is indicated in broken line. The R/C curve 74 is also a significant factor in defining the profile of the surface 40 for obtaining reduced aerodynamic drag without boundary layer separation.

Between 10% C and 56% C, which corresponds to the forward portion 42 of the fan cowl 24 of FIG. 2, the R/C curve 74 is convex with respect to the abscissa X/C and increases in value at a decreasing rate to the position of maximum thickness $T_{max}$ at 56% C. At this point, the R/C curve 74 includes a discontinuity wherein the curve has a double valued slope and abruptly decreases in value. Between 56% C and about 85% C, which corresponds to the intermediate portion 44 of the fan cowl 24 of FIG. 2, the R/C curve 74 is concave with respect to the abscissa X/C and includes a local minimum R/C 78 at about 65% C.

The R/C curve 74 for both the forward portion 42 and the intermediate portion 44 remains positive in value indicating that the actual profile of the outer surface 40 of the fan cowl 24 of FIG. 2 is convex with respect to the chord 38. At about 85% C, corresponding to the second intersection 50, the R/C curve 74 approaches an infinite value indicating that the actual profile of the fan cowl 24 approaches a straight line. Between 85% C and 100% C, which corresponds to the aft portion 46 of the fan cowl 24, the actual profile of the fan cowl 24 can remain substantially straight or concave, with the R/C curve 74 being negative in value.

Figure 5:
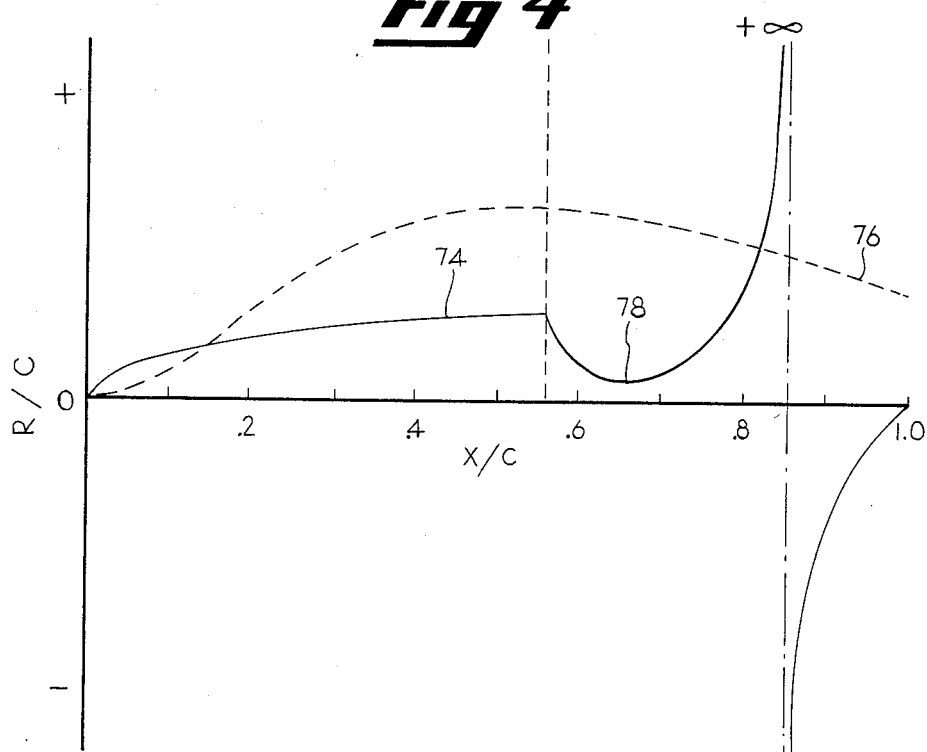
FIG. 5 is a graph illustrating the radius of curvature of the nacelle of FIG. 2 normalized with respect to the reference chord.

In contrast to the prior art R/C curve 76 shown in broken line in FIG. 5, which is continuous and substantially convex with respect to the abscissa X/C, the laminar flow R/C curve 74 contains discontinuities and both convex and concave portions as above described which are preferred for increasing the extent of laminar flow over the fan cowl 24 without causing boundary layer separation thereover.

Figure 7:
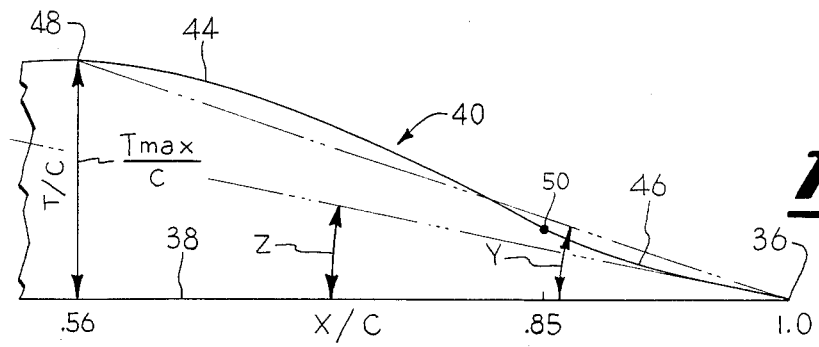
FIG. 7 is an enlarged view of a trailing edge region of the normalized nacelle profile shown in FIG. 4.

FIG. 7 illustrates in further detail the graph of FIG. 4 between 56% C and 100% C. This region of the fan cowl 24 is significant in promoting the return of the pressure to the ambient freestream value without promoting boundary layer separation. More specifically, the aft portion 46 of the fan cowl 24 includes a chordal angle Y defined as the angle between the chord 38 and a line connecting the outer surface 40 at the maximum thickness $T_{max}$ and the trailing edge 36. The chordal angle Y according to the invention is within the range of about 6° to about 11° and is preferably about 9°. The chordal angle Y is approximately twice as large in magnitude as compared to that of the prior art nacelle 52 shown in FIG. 2. In addition, the aft portion 46 of the outer surface 40 has a trailing edge angle Z, defined between the chord 38 and a line tangent to the outer surface 40 at the trailing edge 36. The trailing edge angle Z according to the invention is less than that of the chordal angle Y and is preferably about 8°.

The profile of the outer surface 40, as illustrated in the Figures and as above-described, will provide a nacelle having reduced aerodynamic drag compared to typical prior art nacelles. It is to be appreciated that no one factor alone is effective for providing extended laminar flow without boundary layer separation. The combination of factors as above described according to the present invention is preferred.

The above description of the profile of the outer surface 40 is applicable for any longitudinal section of the fan cowl 24. However, with respect to any sections about the circumference of the fan cowl 24 which are influenced by the wing 12, pylon 14, or fuselage, the profile of the outer surface 40 as illustrated in FIG. 4 can include suitable variations thereof to account for these influences and still be within the scope of the present invention.

The nacelle 20, or fan cowl 24 in particular, provided in accordance with the present invention can result in a reduction of aerodynamic drag at cruise of approximately 50% when compared to prior art nacelles. However, the leading edge 34 as above-described is less effective for off-cruise operation of the aircraft. To improve the effects of the leading edge 34 during off-cruise operation of the aircraft, a suitable, conventional leading edge device (not shown) can be provided. The leading edge device is effective for modifying the flow over the forward portion 42 of the fan cowl 24 for maintaining a non-separated boundary layer during off-cruise operation of the aircraft.

Although the invention has been described with respect to a nacelle 20 comprising a fan cowl 24 of a high bypass separate flow gas turbofan engine 10, it is to be appreciated that a suitable laminar flow nacelle can be provided for other engine applications.

Figure 8:
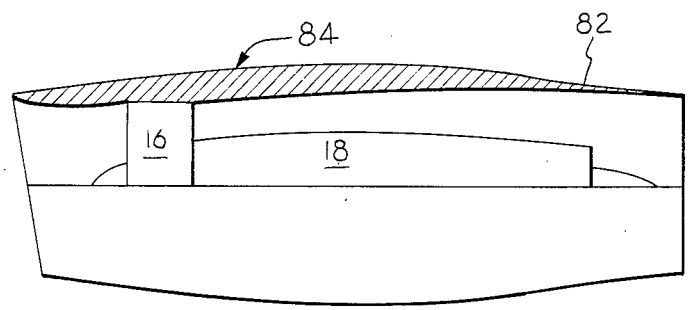
FIG. 8 is a sectional view of a single exhaust gas turbine engine incorporating another embodiment of the present invention.

For example, a laminar flow nacelle 82 according to another embodiment of this invention can be provided for a single exhaust turbojet or turbofan engine 84 as is illustratd in FIG. 8. The contour of the nacelle 82 is generally similar to the contour of the nacelle 82 is generally similar to the contour of the fan cowl 24 illustrated in FIG. 2 and conforms to the normalized laminar flow profile 72 of FIG. 4. Also, the laminar flow nacelle 82 is effective for producing the laminar flow $C_P$ distribution 62 as illustrated in FIG. 3.

Furthermore, although an annular laminar flow nacelle 20 has been disclosed, nacelles having shapes other than annular can also be provided. For example, a two-dimensional nacelle (not shown) defined by a plurality of cowl members can be provided wherein each cowl member has a profile effective for promoting the laminar flow $C_P$ distribution 62 as illustrated in FIG. 3.

Of course, it is to be understood that to obtain and maintain laminar flow over any nacelle surface, the surface should be designed substantially smooth for avoiding any discontinuities or sites for propagation of turbulent flow and boundary layer separation.

While there have been described herein what are considered to be preferred embodiments of the present invention, other embodiments will become apparent from the teachings herein. Accordingly, having thus described the invention, what is described to be secured by Letters Patent of the United States is:

We claim:

1. A nacelle for use on an aircraft comprising:
an annular leading edge and an annular trailing edge having a reference chord of length C extending from said leading edge to said trailing edge and;
an outer annular surface continuous from said leading edge to said trailing edge and including a forward portion, an intermediate portion and an aft portion, said outer surface being devoid of aerodynamic drag reducing holes, slots and active devices;
said outer surface having a profile defined by a relative thickness measured perpendicularly from said chord to said outer surface, said thickness increasing along said chord from said leading edge to a position of a maximum thickness at a first intersection joining said forward portion and said intermediate portion, said position of maximum thickness located greater than about 36% C, said thickness decreasing along said chord from said position of maximum thickness to a second intersection joining said intermediate portion and said aft portion and further decreasing from said second intersection to said trailing edge; and
said profile of said outer surface being effective for producing laminar flow along said forward portion and a pressure due to airflow thereover which decreases continuously at a negative gradient from said leading edge to said position of maximum thickness, and being effective for producing turbulent flow along said intermediate portion and said aft portion and a pressure due to airflow thereover which increases continuously at a positive gradient from said position of maximum thickness to said trailing edge.

2. A nacelle according to claim 1 wherein said pressure is represented by a pressure coefficient $C_p$.

3. A nacelle according to claim 1 wherein said position of maximum thickness is disposed between about 50% C and about 60% C.

4. A nacelle according to claim 1 wherein said position of maximum thickness is disposed at approximately 56% C.

5. A nacelle according to claim 1 wherein said maximum thickness of said outer surface has a magnitude greater than about 6% of said chord length C.

6. A nacelle according to claim 1 wherein said pressure decreases from a positive value adjacent said leading edge to a minimum negative value at said position of maximum thickness and increases from said minimum negative value at said position of maximum thickness to a positive value at said trailing edge.

7. A nacelle according to claim 1 wherein said pressure along said aft portion decreases at a decreasing rate from said second intersection to said trailing edge.

8. A nacelle according to claim 1 wherein said leading edge has a radius of curvature less than about 0.5% of said chord length C.

9. A nacelle according to claim 1 wherein said leading edge has a radius of curvature in a range between about 0.1% and about 0.5% of said chord length C.

10. A nacelle according to claim 1 wherein said leading edge has a radius of curvature of about 0.1% of said chord length C.

11. A nacelle according to claim 1 wherein said forward portion has a radius of curvature which is positive in magnitude and increases at a decreasing rate from said leading edge to said position of maximum thickness.

12. A nacelle according to claim 1 wherein said intermediate portion has a radius of curvature which is positive in magnitude and decreases in magnitude from said first intersection to a position of a local minimum positive value and increases therefrom to said second intersection.

13. A nacelle according to claim 12 wherein said second intersection is disposed at about 85% C.

14. A nacelle according to claim 1 wherein said aft portion has a radius of curvature which is negative in magnitude and increases from said second intersecton to said trailing edge.

15. A nacelle according to claim 1 wherein said aft portion of said outer surface has a chordal angle defined between said chord and a line connecting said outer surface at said maximum thickness and said trailing edge, said chordal angle having a value within the range of about 6° to about 11°.

16. A nacelle according to claim 15 wherein said chordal angle is about 9°.

17. A nacelle according to claim 15 wherein said aft portion of said outer surface has a trailing edge angle defined between said chord and a line tangent to said outer surface at said trailing edge, said trailing edge angle having a value less than that of said chordal angle.

18. A nacelle according to claim 17 wherein said trailing edge angle is about 8°.

19. A nacelle according to claim 1 wherein said nacelle comprises a fan cowl of a bypass turbofan engine.

20. A nacelle according to claim 1 wherein said nacelle comprises a cowl for a single exhaust gas turbine engine.

21. A nacelle, according to claim 1, wherein said forward portion has a radius of curvature which is positive in magnitude and increases at a decreasing rate from said leading edge to said position of maximum thickness, wherein said intermediate portion has a radius of curvature which is positive in magnitude and decreases in magnitude from said first intersection to a position of a local minimum positive value and increases therefrom to said second intersection, and wherein said radius of curvature includes a discontinuity at said position of maximum thickness.

22. A nacelle for housing an aircraft engine comprising:
an annular leading edge and an annular trailing edge having a chord of length C extending from said leading edge to said trailing edge; and an outer annular surface continuous from said leading edge to said trailing edge and including a forward portion, an intermediate portion and an aft portion, said outer surface being devoid of aerodynamic drag reducing holes, slots and active devices;

said outer surface having a profile defined by a relative thickness measured perpendicularly from said chord to said outer surface, said thickness having a maximum value of about 7% of said chord length C at an intersection of said forward portion and said intermediate portion, said intersection located at about 56% C;

said aft portion of said outer surface having a chordal angle defined between said chord and a line connecting said outer surface at said maximum thickness and said trailing edge, of about 9°; and said profile of said outer surface being effective for producing laminar flow along said forward portion and a pressure coefficient due to airflow thereover which decreases continuously at a negative gradient from said leading edge to said intersection, and turbulent flow and a pressure coefficient due to airflow thereover which increases continuously at a positive gradient from said intersection to said trailing edge.

23. A method for generating a profile of a nacelle for an aircraft wherein said profile is defined by a relative thickness measured perpendicularly from a reference chord to a continuous, annular outer surface of said nacelle, said chord and said outer surface extending from an annular leading edge to an annular trailing edge of said nacelle, said outer surface being devoid of aerodynamic drag reducing holes, slots and active devices, said method comprising the step of:

providing a nacelle including a profile having a forward portion extending from said leading edge to a position of maximum thickness disposed at greater than about 36% of said chord and a pressure distribution having a negative gradient along said forward portion followed by a positive gradient extending to said trailing edge, said profile being effective for producing laminar flow over said forward portion and for preventing boundary layer separation.

24. A method for generating a profile of a nacelle for an aircraft wherein said profile is defined by a relative thickness measured perpendicularly from a reference chord to a continuous, annular outer surface of said nacelle, said chord and said outer surface extending from an annular leading edge to an annular trailing edge of said nacelle, said outer surface being devoid of aerodynamic drag reducing holes, slots and active devices, said method comprising the steps of:

providing a profile of said nacelle;

determining a pressure distribution due to said profile which results from subsonic cruise operation of said aircraft;

systematically varying said profile of said nacelle and determining said pressure distribution therefor for obtaining a profile having a forward portion extending from said leading edge to a position of maximum thickness disposed at greater than about 36% of said chord and a pressure distribution having a negative gradient along said forward portion followed by a positive gradient extending to said trailing edge, said profile being effective for producing laminar flow over said forward portion and for preventing boundary layer separation.

25. A method for generating a profile of a nacelle according to claim 24 wherein said position of maximum thickness is disposed between about 50% C and about 60% C.

* * * * *

UNITED STATES PATENT AND TRADEMARK OFFICE
CERTIFICATE OF CORRECTION

PATENT NO. : 4,799,633
DATED : January 24, 1989
INVENTOR(S) : Daniel J. Lahti, James L. Younghans It is certified that error appears in the above-identified patent and that said Letters Patent is hereby corrected as shown below:

On the title page:

TITLE: Delete "NECELLE", and in its place insert --NACELLE--.

Column 5, line 10, after "as", delete $$2(P_S - P) \, dv^2$$

AND IN ITS PLACE, INSERT:

$$-- \; 2(P_S - P)/dv^2 \; --$$

Signed and Sealed this

Third Day of July, 1990

*Attest:*

HARRY F. MANBECK, JR.

*Attesting Officer*     *Commissioner of Patents and Trademarks*